United States Patent
Li et al.

(10) Patent No.: US 9,635,144 B2
(45) Date of Patent: Apr. 25, 2017

(54) IMPLEMENTING AN INTER-PAL PASS-THROUGH

(75) Inventors: Guoqing Li, Portland, OR (US); Carlos Cordeiro, Portland, OR (US); Bahareh Sadeghi, Portland, OR (US)

(73) Assignee: INTEL CORPORATION, Santa Clara, CA (US)

(\*) Notice: Subject to any disclaimer, the term of this patent is extended or adjusted under 35 U.S.C. 154(b) by 298 days.

(21) Appl. No.: 13/995,637

(22) PCT Filed: Dec. 22, 2011

(86) PCT No.: PCT/US2011/066748
§ 371 (c)(1),
(2), (4) Date: Jun. 19, 2013

(87) PCT Pub. No.: WO2013/095488
PCT Pub. Date: Jun. 27, 2013

(65) Prior Publication Data
US 2013/0315118 A1 Nov. 28, 2013

(51) Int. Cl.
*H04L 29/06* (2006.01)
*H04W 80/00* (2009.01)
*H04L 29/08* (2006.01)
*H04W 84/12* (2009.01)

(52) U.S. Cl.
CPC ............ *H04L 69/08* (2013.01); *H04W 80/00* (2013.01); *H04L 69/32* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,542,516 B1\* | 4/2003 | Vialen | H04L 29/06 370/335 |
| 6,785,733 B1 | 8/2004 | Mimura et al. | |
| 7,546,369 B2\* | 6/2009 | Berg | H04L 29/06 709/219 |

(Continued)

FOREIGN PATENT DOCUMENTS

WO 2013/095488 A1 6/2013

OTHER PUBLICATIONS

International Preliminary Report on Patentability and Written Opinion received for PCT Patent Application No. PCT/US2011/066748, mailed on Jul. 3, 2014, 9 pages.

(Continued)

*Primary Examiner* — Noel Beharry
*Assistant Examiner* — Rodrick Mak
(74) *Attorney, Agent, or Firm* — Ellis B. Ramirez; Prass LLP

(57) ABSTRACT

A system and method are provided that implement an inter-protocol adaptation layer (inter-PAL) pass-through processing scheme in wireless communicating devices operating with separate PALs to combine use of the individually-beneficial features of one PAL by allowing a first order capability for cross-talk between the PALs. A first PAL data packet is passed through the communicating system using a second PAL syntax. In so doing, a capacity to employ beneficial features of the second PAL advantageously in enhancement of the information in a data packet generated according to the first PAL is provided.

11 Claims, 4 Drawing Sheets

(56) References Cited

U.S. PATENT DOCUMENTS

| | | | |
|---|---|---|---|
| 7,653,058 B2 | 1/2010 | Lee et al. | |
| 2004/0218623 A1 | 11/2004 | Goldenberg et al. | |
| 2006/0184976 A1* | 8/2006 | Lee | H04B 10/1125 725/81 |
| 2007/0177495 A1* | 8/2007 | Ametsitsi | H04L 69/32 370/208 |
| 2008/0247403 A1 | 10/2008 | Seo et al. | |
| 2009/0016378 A1* | 1/2009 | Takase | H04L 12/5601 370/467 |
| 2010/0130138 A1* | 5/2010 | Nandagopalan et al. | 455/69 |
| 2012/0063376 A1* | 3/2012 | Kambhatla | G09G 5/363 370/310 |
| 2012/0106474 A1* | 5/2012 | Wu | H04B 7/0619 370/329 |
| 2012/0163362 A1* | 6/2012 | Noh et al. | 370/338 |
| 2012/0257642 A1* | 10/2012 | Lee | H04N 21/2368 370/503 |
| 2013/0282938 A1* | 10/2013 | Huang et al. | 710/106 |

OTHER PUBLICATIONS

International Search Report and Written Opinion received for PCT Patent Application No. PCT/US2011/066748, mailed on Sep. 25, 2012, 12 pages.

* cited by examiner

IMPLEMENTING AN INTER-PAL PASS-THROUGH

BACKGROUND

1. Field of the Disclosed Embodiments

This disclosure relates to systems and methods for implementing an inter-PAL pass-through scheme in which protocol adaptation layers (PALs) may be shared in a manner that is beneficial to the underlying MAC/PHY layers.

2. Related Art

The next step in wireless communication is nearing. A first generation of mmWave, such as 60 GHz, wireless communication systems is in the process of being standardized as, for example, the proposed IEEE 802.11ad/WiGig standard. A broad spectrum of products that support mmWave wireless communication are being developed and manufactured.

The Wireless Gigabit Alliance (WiGig) has defined the specification for the 60 GHz MAC/PHY layer. The WiGig MAC/PHY specification enables data rates up to 7 Gbps, which is significantly faster than any data rate available in Wi-Fi networks based on current standards. WiGig systems operate in the 60 GHz frequency band, and have a broader spectrum available than the 2.4 GHz and 5 GHz bands used by existing Wi-Fi communications. This allows wider bandwidths that support faster transmission speeds.

WiGig has defined multiple protocol adaptation layers (PALs) on top of the 60 GHz MAC/PHY layer. This is not a wholly new concept in that other standards, such as Wi-Fi define similar or different protocol adaptation layers that facilitate specific applications over different MAC/PHY layers. FIGS. 1A and 1B illustrate examples of the current, and currently proposed, PAL structure for Wi-Fi (FIG. 1A) and WiGig 60 GHz (FIG. 1B), respectively. As shown in FIG. 1A, currently in Wi-Fi, a Wi-Fi Display (WFD) PAL 110 is specified on top of the Wi-Fi MAC/PHY layer 100. As shown in FIG. 1B, multiple PALs 160-180 are specified on top of the WiGig 60 GHz MAC/PHY layer 150. These separate PALs 160-180 provide for optimal support of different types of applications according to the WiGig proposed standards for 60 GHz wireless communication. For example, the recently-developed WiGig Display Extension (WDE) PAL 160 supports wireless transmission of audio/video data via multiple interfaces and offers key audio/video applications, such as transmission of compressed or uncompressed video from a computer or digital camera to an HDTV, a monitor or a projector. The WiGig Serial Extension (WSE) PAL 165 defines high-performance wireless implementations of widely-used computer interfaces over 60 GHz enabling the multi-gigabit wireless connectivity between devices for, for example, USB type data traffic. The WiGig Bus Extension (WBE) PAL 170 supports Peripheral Component Interconnect Express (PCIe) data traffic. A separate Secure Digital Input/Output (SDIO) PAL 175 supports SDIO traffic. Additionally, the WiGig architecture and standards leave open the possibility, and even likelihood, that other PALs 180 may be specified to support other traffic types as may be defined by WiGig in the future.

In this disclosure, the WiGig PALs and the parallel Wi-Fi PAL will be generally referred to simply as the PALs.

A difficulty in the currently-defined specifications is that there is no mechanism for cross-talk between the separate PALs such as WFD, WDE, WSE, WBE, SDIO and others. Specifically, at the transmitter and receiver ends of the wireless communication link, the PALs are separately and independently handled. One PAL does not, for example, currently understand the syntax of other PALs.

Each PAL defines unique features to optimize the transmission for the particular wireless communication traffic based on the application characteristics supported by that PAL. Conventionally, owing to the inability for cross-talk, features defined in one PAL cannot be re-used by another PAL. Each PAL is uniquely designed to deal with a specific type of information and each unique PAL, therefore, includes certain beneficial features based around the types of applications that the particular PAL supports.

The inability to provide cross-PAL communication results in certain drawbacks. For example, as the next generation wireless display requires technology such as WDE to support the driving demand for the cable replacement user experience, users will demand the available richer wireless displays that WDE supports. This may cause backward compatibility problems when different products implementing different PALs attempt to communicate in the marketplace, which could, in turn, lead to market confusion and customer dissatisfaction.

Further, a user is not afforded a best combination of currently-available features from all of the PALs based on their inability to communicate with one another. There are beneficial functions in, for example, one PAL that is not available to the user when the application is supported by a separate PAL.

SUMMARY OF THE DISCLOSED EMBODIMENTS

It would be advantageous to define a simple method by which beneficial features of one PAL could be shared with another PAL in order to, for example, maximally reuse Wi-Fi display components when upgrading to WiGig display for advanced features, leading to optimal performance with minimum implementation complexity.

In various exemplary embodiments, the systems and methods according to this disclosure may take advantage of the individually-beneficial features of one PAL by allowing a first order capability for cross-talk between the PALs.

In various exemplary embodiments, the systems and methods according to this disclosure may define an inter-PAL communication (pass-through) scheme by which a first PAL's data packet may be "passed through" using a second PAL's syntax. In doing so, the systems and methods according to this disclosure may provide a capacity to employ the second PAL's beneficial features in applications supported by the first PAL.

In various exemplary embodiments, the systems and methods according to this disclosure may address the difficulty with, for example, backward compatibility by providing a mechanism of re-using features of a first PAL in a second PAL and customizing the protocol depending on the desire of the backward compatibility choices.

In various exemplary embodiments, the systems and methods according to this disclosure may provide a method by which a data packet according to a first PAL may be encapsulated with header information for a second PAL, which is then transmitted and received according to the second PAL's header information. The header information of the second PAL may include certain information that enables certain functions that would be beneficial to the data of the first PAL.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing an inter-PAL pass-through scheme in which PALs may be shared in a manner that is beneficial to the underlying MAC/PHY layers will be described, in detail, with reference to the following drawings, in which.

DETAILED DESCRIPTION OF THE DISCLOSED EMBODIMENTS

The systems and methods for implementing an inter-PAL pass-through scheme in which PALs may be shared in a manner that is beneficial to the underlying MAC/PHY layers will generally refer to this specific utility for those systems and methods. Exemplary embodiments described and depicted in this disclosure should not be interpreted as being specifically limited to any particular configuration, or directed to any particular intended use. Although this disclosure will describe at least one specific example of a combination of PALs for clarity and ease of understanding of the disclosed concepts, it must be recognized that the systems and methods according to this disclosure are intended to encompass various combinations of PALs being linked together as described below.

Specific reference to, for example, any particular communication device, including specifically cooperating wireless communicating devices operating in the mmWave, and particularly 60 GHz, region of the RF spectrum, should be understood also as being exemplary only, and not limiting, in any manner, to any particular class of devices. For example, reference is made throughout this disclosure to Wi-Fi in addition to WiGig. The systems and methods according to this disclosure will be described as being particularly adaptable to the above-described function, but should not be considered as being limited to only this function.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and method steps, and combinations of those elements and method steps, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for implementing an inter-PAL pass-through scheme in which PALs may be shared in a manner that is beneficial to the underlying MAC/PHY layers, as well as a corresponding non-transitory computer-readable medium having recorded on it a program that, when executed by a processor, causes the processor to execute the steps of the method for implementing the inter-PAL pass-through scheme in which PALs may be shared in a manner that is beneficial to the underlying MAC/PHY layers.

Figure 1A:
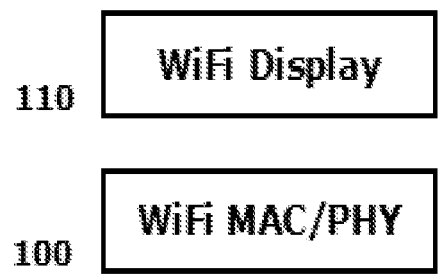
FIGS. 1A and 1B illustrate the current, and currently proposed, PAL structures for Wi-Fi and WiGig 60 GHz, respectively.
Figure 1B:
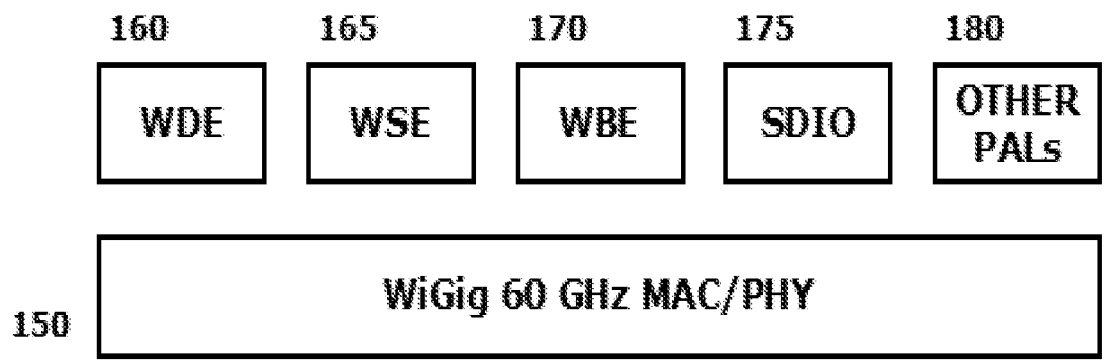
Figure 2:
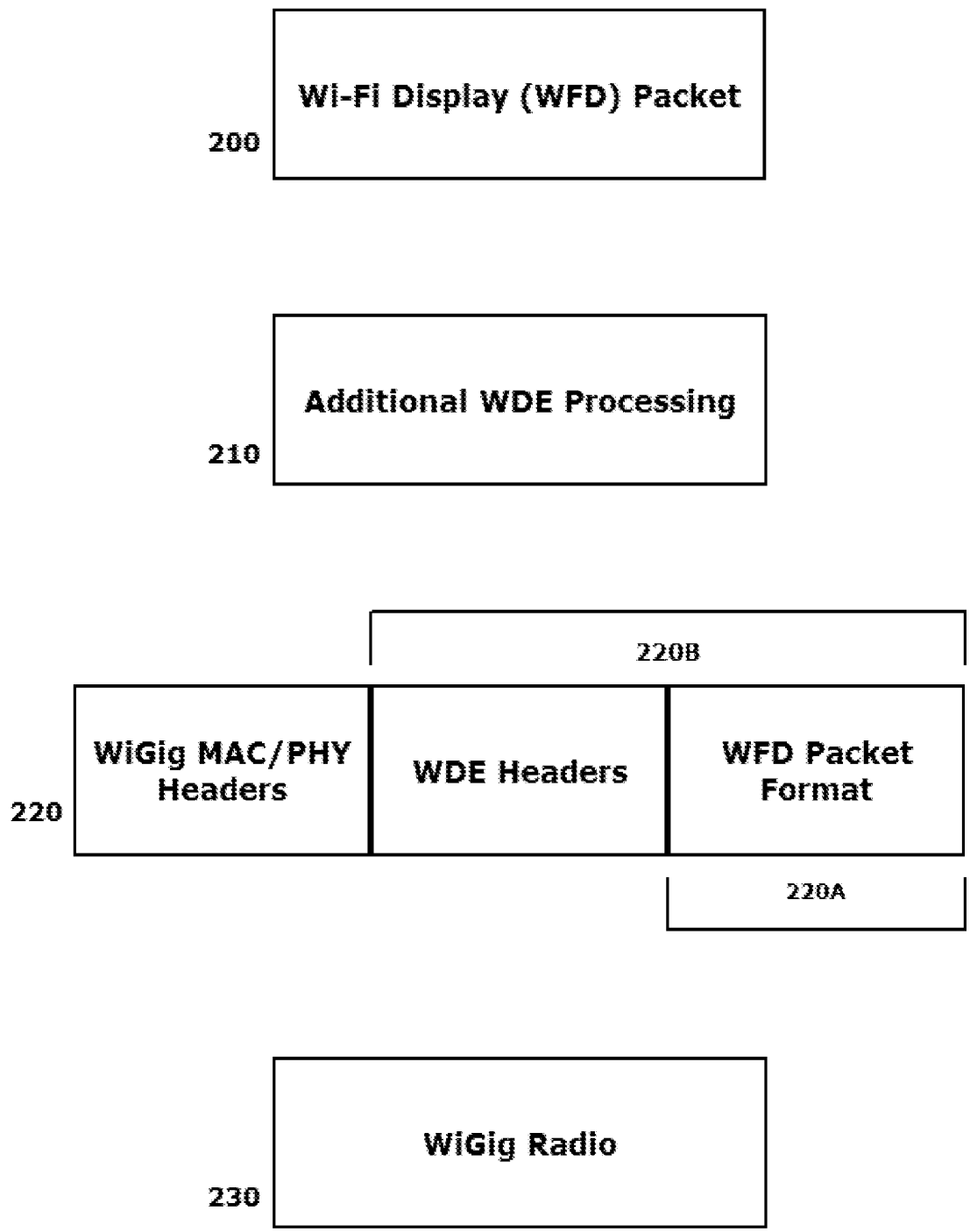
FIG. 2 illustrates an exemplary overview of an inter-PAL pass-through scheme according to this disclosure.

FIG. 2 illustrates an exemplary overview of an inter-PAL pass-through scheme according to this disclosure. As shown in FIG. 2, a WFD packet 200 may undergo additional processing according to the methods disclosed below in which additional WDE processing 210 is undertaken to arrive at a transmission packet 220. In the transmission packet 220, there may be a section 220A that conforms to the WFD packet format and a section 220B that conforms to the WDE packet format. In this manner, the WFD packet will conform to WFD syntax. The additional WDE headers will make the data packet conform to WDE syntax.

This provides, at the transmitter side, an existing WFD engine can run according to its normal operating structure. A WFD packet is generated. The generated WFD packet is then encapsulated as the payload of a WDE packet with the WDE packet header information included. A new set of features conforming to the WDE standard can be used based on the information provided by the WDE headers. This would then constitute a WFD pass-through over WDE. The WFD packet remains unchanged. It is the information provided in the WDE headers that may allow for the system to recognize and use WDE features. In this manner, a new packet type known as WFD pass-through is provided, i.e., a WFD packet that is unchanged, but to which WDE headers are attached.

At the receiver side, a WDE receiver receives the transmitted packet and may parse the packet removing the WDE headers to deliver the payload which is the WFD packet in this example to the WFD receiver. The new packet format that may be defined in the WDE specification is a WFD pass-through as the unchanged WFD packet data is encapsulated or wrapped in the WDE header format. This packet format is identified to the WDE receiver in order that the WDE receiver knows how to deal with the received packet. The WDE receiver would undertake only the minimal processing necessary to deliver the WFD packet to the WFD receiver once the WDE header information defines the payload as a pass-through WFD packet. The rest of the WFD processing in this case would be handed over to the WFD PAL receiver.

The processing at the WDE receiver, however, allows for the advantageous portions of the WDE header processing information to be used, for example, to improve the quality of the delivered video in the WFD packet. WFD data, which is processed at lower data rates, at least gains the advantages associated with high data rate WDE transmission. Quality of the service, therefore, provided to the user is increased.

As indicated above, the use of the WFD and WDE PALs in FIG. 2 is purely exemplary. Any first PAL and second PAL could be as easily and as beneficially combined. It should be appreciated, therefore, that the exemplary depiction in FIG. 2 is not intended to be limiting as an only configuration available for the disclosed systems and methods. In other words, no specific configuration or combination is to be implied by the depiction in FIG. 2.

Figure 3:
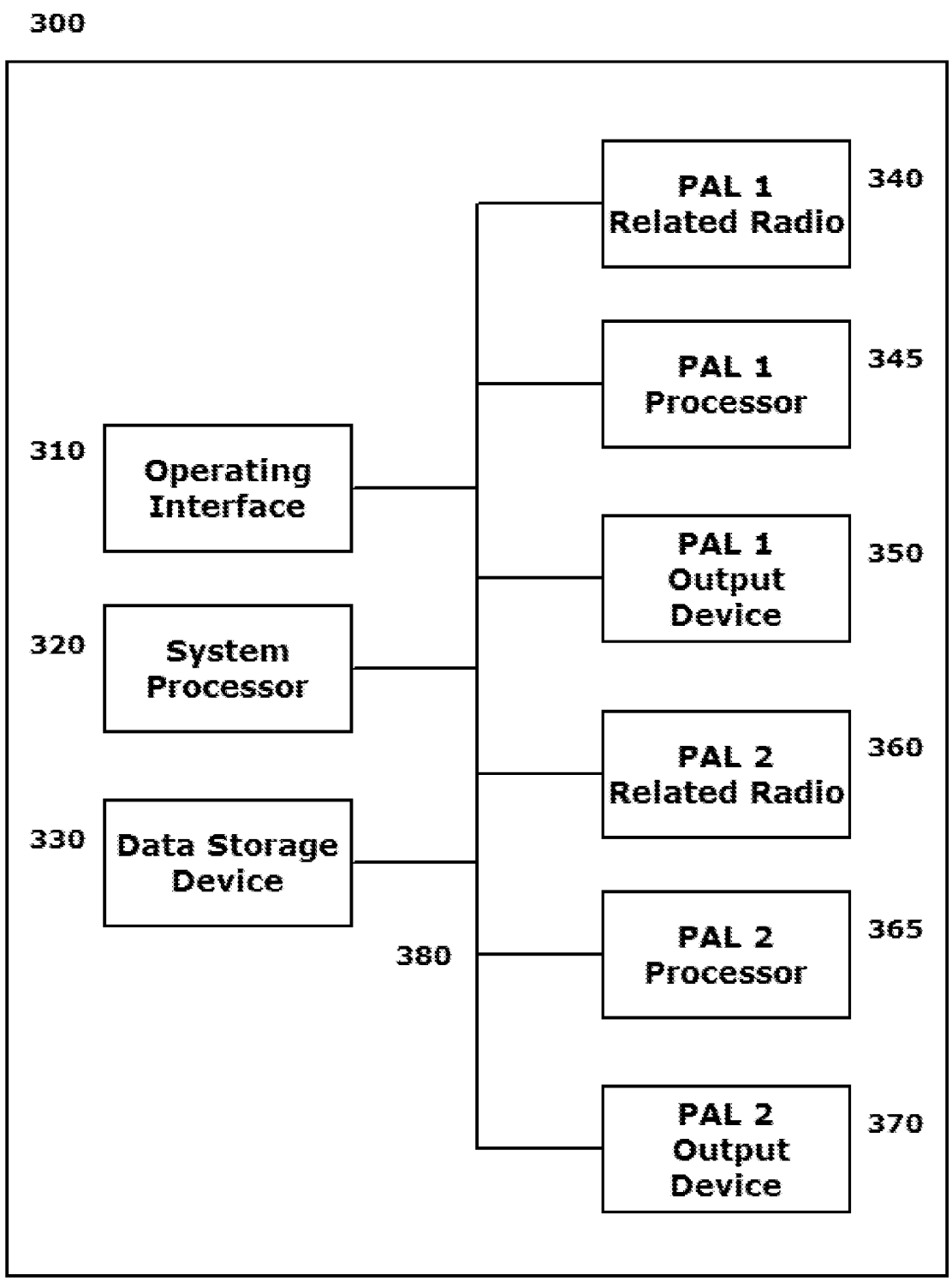
FIG. 3 illustrates a block diagram of an exemplary system for implementing an inter-PAL pass-through scheme according to this disclosure.

FIG. 3 illustrates a block diagram of an exemplary system 300 for implementing an inter-PAL pass-through scheme according to this disclosure. The exemplary system 300 may be in either of a transmitter or receiver side of a wireless communication link.

The exemplary system 300 may include an operating interface 310 by which the system 300 may be manually operated by a user, or automatically operated by an overarching system within which the system 300 is installed according to instructions that may be input to and interpreted by the system 300. The operating interface 310 may perform such simple functions as turning on and off the system 300 at appropriate times, or otherwise performing higher level functions such as, for example, determining whether to execute an inter-PAL pass-through scheme. The system 300 may make such a determination according to a type of information to be transmitted or an availability of a specific PAL receiver with which the system 300 may communicate.

The system 300 may include one or more local processors 320 for individually undertaking determination processes that are carried out by the system 300. The processor(s) 320 may provide input to the system 300 regarding implementing an inter-PAL pass-through scheme based on inputs such as those discussed briefly above. The processor(s) 320 may carry out processing and control functions for directing the inter-PAL pass-through scheme in the system 300. Processor(s) 320 may include at least one conventional processor or microprocessor that interprets and implements instructions to make the determinations appropriate to carrying into effect the inter-PAL pass-through scheme discussed in this disclosure.

The system 300 may include one or more data storage devices 330. Such data storage device(s) 330 may be used to limitedly store data or operating programs as may be appropriate for use in the system 300, and specifically the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for the processor(s) 320. In these installations, the data storage device(s) 330 may be provided as integral components of the system 300, or otherwise may be provided external to, and in wired or wireless communication with, system 300 such as, for example, in communication with the other components of the system 300 for implementing the inter-PAL pass-through scheme as discussed below.

The system 300 may include one or more PAL related radios 340,360 that are based on the individual MAC/PHY layers with which the separate PALs are associated. There need not be more than one radio, however, for example, in instances, as in WiGig, where separate PALs are associated with a single underlying WiGig 60 GHz MAC/PHY layer.

The system 300 may include at least two PAL processors 345,365. The at least two PAL processors 345,365 may be used to generate a data packet according to one of the PALs and to encapsulate that data according to the other PAL for transmission as an inter-PAL pass-through data packet by one of the radios when on a transmitter side. When on a receiver side, the received data with header information for one of the PALs may be processed by an appropriate one of the PAL processors 345,365 that reads the header information and determines if the received data packet is an inter-PAL pass-through data packet. At that point, the one of the PAL processors 345,365 that that interprets the received packet data may strip off the header data and otherwise provide only limited processing before delivering the inter-PAL pass-through data packet to the other PAL output device 350,370 essentially unchanged.

As indicated briefly above, the terms PAL 1 and PAL 2 are shown in FIG. 3 in order to indicate the generic nature of the inter-PAL pass-through scheme as it may be applied to varying combinations of pairs of differing PALs.

All of the various components of the system 300, as depicted in FIG. 3, may be connected by one or more data/control busses 380. The data/control bus(ses) 380 may provide internal wired or wireless communication between the various components of the system 300, whether all of those components are housed integrally as a single unit or are otherwise connected to and in wired or wireless communication with each other.

It should be appreciated that, although depicted in FIG. 3 as an integral unit, the various disclosed elements of the system 300 may be arranged in any combination of subsystems as individual components or combinations of components, integral to a single unit, or external to, and in communication with the single unit. In other words, no specific configuration as an integral unit or as a support unit, for the system 300 is to be implied by the depiction in FIG. 3. Further, as noted above, certain of the functions described may actually be housed in or carried out by components of an overarching system that the system 300 supports.

The disclosed embodiments may include a method for implementing an inter-PAL pass-through scheme. The method may include using a first PAL to generate a data packet at a transmitter side. The method may include further processing of the generated data packet at the transmitter side to add packet header information according to a second PAL. The method may use one or more common strategies for identifying the processed data packet with the additional packet header information as a first PAL pass-through data packet. The first PAL pass-through data packet may then be transmitted by a device according to the second PAL. At the receiver side, the received data packet may be evaluated according to the second PAL and any identifying information in the header, for example, to determine whether it should be treated as an inter-PAL pass-through data packet based on header information or some other indication. In instances where the data packet is to be treated as an inter-PAL pass-through data packet, the second PAL receiver may process the received packet to strip off the second PAL headers from the first PAL pass-through data packet and deliver the unchanged first PAL data packet to the first PAL receiver with little additional processing.

Figure 4:
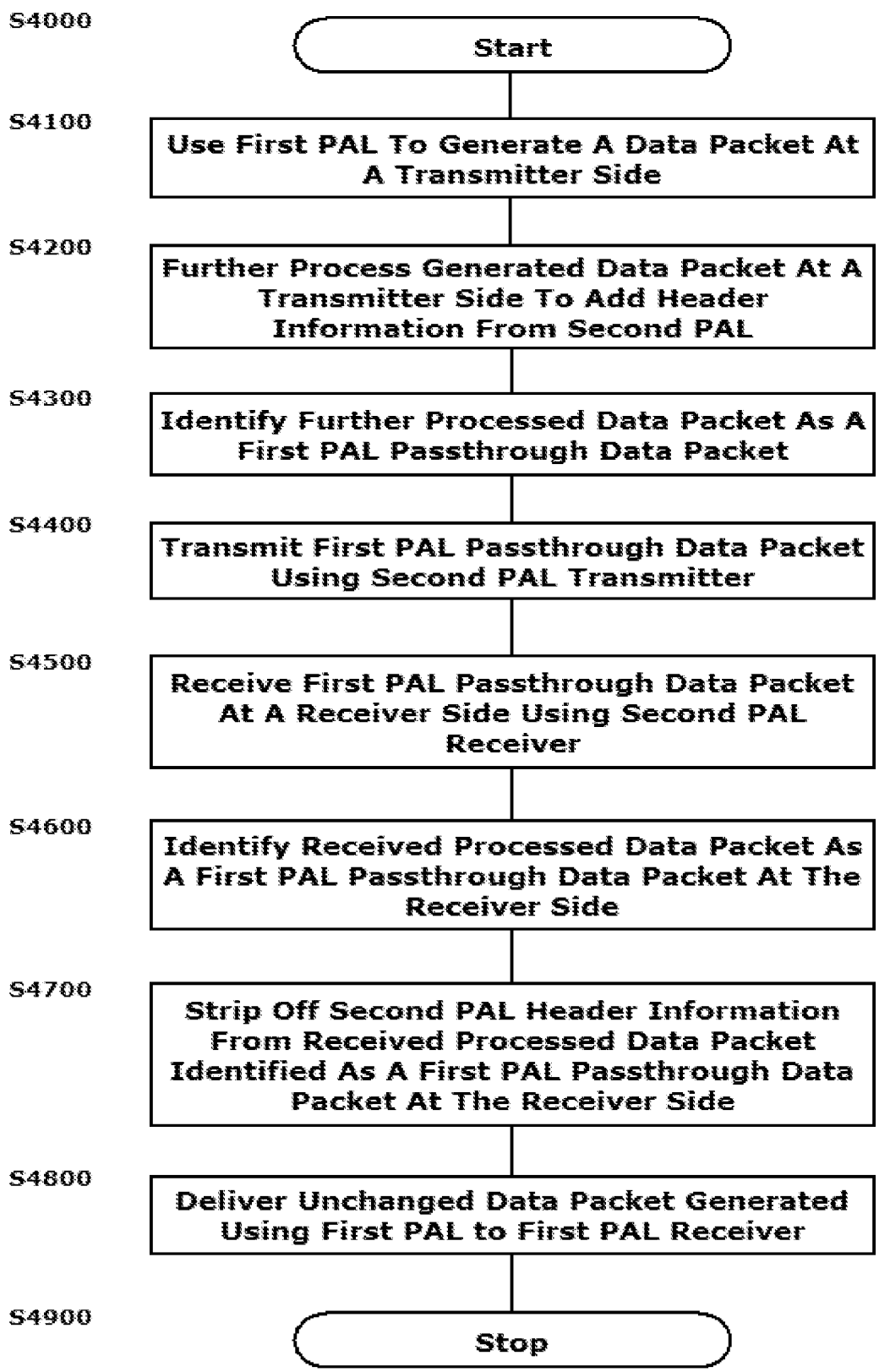
FIG. 4 illustrates a flowchart of an exemplary method for implementing an inter-PAL pass-through scheme according to this disclosure.

FIG. 4 illustrates a flowchart of an exemplary method for implementing an inter-PAL pass-through scheme according to this disclosure. As shown in FIG. 4, operation of the method commences at Step S4000 and proceeds to Step S4100.

In Step S4100, a first PAL may be used to generate a data packet at a transmitter side. Operation of the method proceeds to Step S4200.

In Step S4200, the first PAL generated data packet may be further processed at the transmitter side to encapsulate the first PAL generated data packet with second PAL headers. Operation of the method proceeds to Step S4300.

In Step S4300, additional measures may be undertaken, such as with additional information in the second PAL packet header, to identify the generated and encapsulated data packet as a first PAL pass-through data packet. Operation of the method proceeds to Step S4400.

In Step S4400, the first PAL pass-through data packet may be transmitted using a second PAL transmitter. Operation of the method proceeds to Step S4500.

In Step S4500, the first PAL pass-through data packet may be received at the receiver side using a second PAL receiver. Operation of the method proceeds to Step S4600.

In Step S4600, the second PAL receiver may recognize/identify the received data packet as a first PAL pass-through data packet. Operation of the method proceeds to Step S4700.

In Step S4700, the second PAL receiver may strip off the packet header data and perform other minimal processing. Operation of the method proceeds to Step S4800.

In Step S4800, the second PAL receiver may deliver the data packet generated by the first PAL at the transmitter side essentially unchanged to the first PAL receiver. Operation of the method proceeds to Step S4900, where operation of the method ceases.

The disclosed embodiments may include a non-transitory computer-readable medium storing instructions which, when executed by a processor, may cause the processor to execute the steps of the method as outlined, and as described in detail, above.

The above-described exemplary systems and methods reference certain conventional or otherwise known wireless signal transmitting/receiving components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described.

Those skilled in the art will appreciate that other embodiments separate from those specifically disclosed may be practiced using the concepts described above and such embodiments should reasonably be considered to be encompassed in the above discussion.

Embodiments may also be practiced in distributed network computing environments where tasks are performed by local and remote processing devices, generally as outlined above, that are linked to each other by hardwired links, wireless links, or a combination of both through the computing network.

Embodiments within the scope of the present disclosure may include computer-readable media having stored computer-executable instructions or data structures that can be accessed, read and executed by an appropriate processor. Such computer-readable media can be any available media that can be accessed by the processor in, or in communication with, the monitored communication link. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually, or in combination. Computer-executable instructions also include program modules that are remotely stored for access by a processor to be executed by the processor when the processor is caused to communicate in a network environment.

The exemplary depicted sequence of executable instructions or associated data structures represents one example of a corresponding sequence of acts for implementing the functions described in the steps. The steps of the exemplary methods, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. Accordingly, the appended claims and their legal equivalents should only define the disclosure, rather than any specific examples given.

What is claimed is:

1. A method for implementing an inter-PAL processing scheme, comprising:
   generating, with a processor, a data packet according to a first protocol adaptation layer (PAL) as a first PAL generated data packet;
   processing the first PAL generated data packet to add header information for a second PAL data packet;
   encapsulating the first PAL generated data packet as a payload for the second PAL data packet;
   adding identifying information to the processed and encapsulated first PAL generated data packet to identify the first PAL generated data packet in the second PAL data packet as a pass-through first PAL generated data packet prior to transmitting;
   transmitting the pass-through first PAL generated data packet as a second PAL data packet using a transmitter that supports the second PAL, wherein the transmitter includes one or more PAL related radios that are based on the individual MAC/PHY layers with which the separate PALs are associated;
   receiving the transmitted second PAL data packet having the pass-through first PAL generated data packet with a receiver that supports the second PAL;
   removing the second PAL header data from the transmitted second PAL data packet to retrieve the encapsulated first PAL generated data packet;
   delivering the encapsulated first PAL generated data packet to a first PAL receiver;
   wherein the encapsulated first PAL generated data packet being delivered to the first PAL receiver is unchanged from the first PAL generated data packet;
   wherein the first and second PALs being different individual PALs associated with different MAC/PHY layers.

2. The method of claim 1, further comprising executing further processing to the first PAL generated data packet in addition to the removing of the second PAL header data before the delivering of the first PAL generated data packet to the first PAL receiver.

3. The method of claim 2, the executing of the further processing to the first PAL generated packet comprising enhancing at least one characteristic of the first PAL generated packet based on characteristics that the second PAL uniquely supports.

4. The method of claim 1, further comprising: recognizing the identifying information with a second PAL receiver.

5. The method of claim 1, the first and second PALs being different individual PALs selected from a group consisting of Wi-Fi Display, a Wireless-Gigabit (WiGig) Bus Extension, a Wireless-Gigabit (WiGig) Serial Extension, a Wireless-Gigabit (WiGig) Display Extension and a Wireless-Gigabit (WiGig) SD/SDIO.

6. The method of claim 1, the first and second PALs being different individual PALs on top of a Wireless-Gigabit (WiGig) 60 GHz MAC/PHY layer.

7. A system implementing an inter-PAL processing scheme, comprising:
   a transmitter side first PAL processor that generates a data packet according to a first PAL as a first PAL generated data packet;
   a transmitter side second PAL processor that process the first PAL generated data packet to add header information for a second PAL data packet;
   encapsulating the first PAL generated data packet as a payload for the second PAL data packet;
   wherein the transmitter side second PAL processor adding identifying information to the processed and encapsulated first PAL generated data packet in the second PAL data packet to identify the first PAL generated data packet as a pass-through first PAL generated data packet prior to transmitting;
   a transmitter that supports the second PAL and transmits the pass-through first PAL generated data packet as a second PAL data packet, wherein the transmitter includes one or more PAL related radios that are based on the individual MAC/PHY layers with which the separate PALs are associated;
   a receiver that supports the second PAL with which the transmitter is in wireless communication, the receiver receiving the transmitted second PAL data packet having the pass-through first PAL generated data packet;
   a receiver side second PAL processor that processes the received second PAL data packet by removing the second PAL header data from the transmitted second PAL data packet so as to retrieve the encapsulated first PAL generated data packet;
   a receiver that supports the first PAL to which the first PAL generated data packet is delivered;
   wherein the receiver side second PAL processor being programmed to execute further processing to the first PAL generated data packet in addition to the removing of the second PAL header data before delivering the encapsulated first PAL generated data packet to the first PAL receiver;
   wherein the receiver side second PAL processor being further programmed to execute the further processing to the encapsulated first PAL generated packet to enhance at least one characteristic of the encapsulated first PAL generated packet based on characteristics that the second PAL uniquely supports;
   wherein the transmitter side second PAL processor being programmed to add identifying information to the encapsulated first PAL generated data packet to identify the first PAL generated data packet as an inter-PAL pass-through first PAL generated data packet prior to the transmitter transmitting the second PAL data packet;
   wherein the first and second PALs being different individual PALs associated with different MAC/PHY layers;
   wherein the encapsulated first PAL generated data packet being delivered to the first PAL receiver is unchanged from the first PAL generated data packet.

8. The system of claim 7, the receiver side second PAL processor being further programmed to recognize the second PAL data packet as the inter-PAL pass-through first PAL generated data packet for processing with the receiver side second PAL processor based on the identifying information added to the first PAL generated data packet.

9. The system of claim 7, the first and second PALs being different individual PALs selected from a group consisting of Wi-Fi Display, a Wireless-Gigabit (WiGig) Bus Extension, A Wireless-Gigabit (WiGig) Serial Extension, a Wireless-Gigabit (WiGig) Display Extension and a Wireless-Gigabit (WiGig) SD/SDIO.

10. The system of claim 7, the first and second PALs being different individual PALs on top of a Wireless-Gigabit (WiGig) 60 GHz MAC/PHY layer.

11. A non-transitory computer-readable medium storing computer-readable instructions which, when executed by a processor, cause the processor to execute a method implementing an inter-PAL processing scheme, comprising:
   generating a data packet according to a first PAL as a first PAL generated data packet;
   processing the first PAL generated data packet to add header information for a second PAL data packet;
   encapsulating the first PAL generated data packet as a payload for the second PAL data packet;
   adding identifying information to the processed and encapsulated first PAL generated data packet to identify the first PAL generated data packet in the second PAL data packet as a pass-through first PAL generated data packet prior to transmitting; and
   transmitting the pass-through first PAL generated data packet as a second PAL data packet using a transmitter that supports the second PAL, wherein the transmitter includes one or more PAL related radios that are based on the individual MAC/PHY layers with which the separate PALs are associated;
   receiving the transmitted second PAL data packet having the pass-through first PAL generated data packet with a receiver that supports the second PAL;
   removing the second PAL header data from the transmitted second PAL data packet to retrieve the encapsulated first PAL generated data packet;
   delivering the encapsulated first PAL generated data packet to a first PAL receiver;
   wherein the first and second PALs being different individual PALs associated with different MAC/PHY layers;
   wherein the first and second PALs being different individual PALs on top of a Wireless-Gigabit (WiGig) 60 GHz MAC/PHY layer;
   wherein the encapsulated first PAL generated data packet being delivered to the first PAL receiver is unchanged from the first PAL generated data packet.

* * * * *